United States Patent Office.

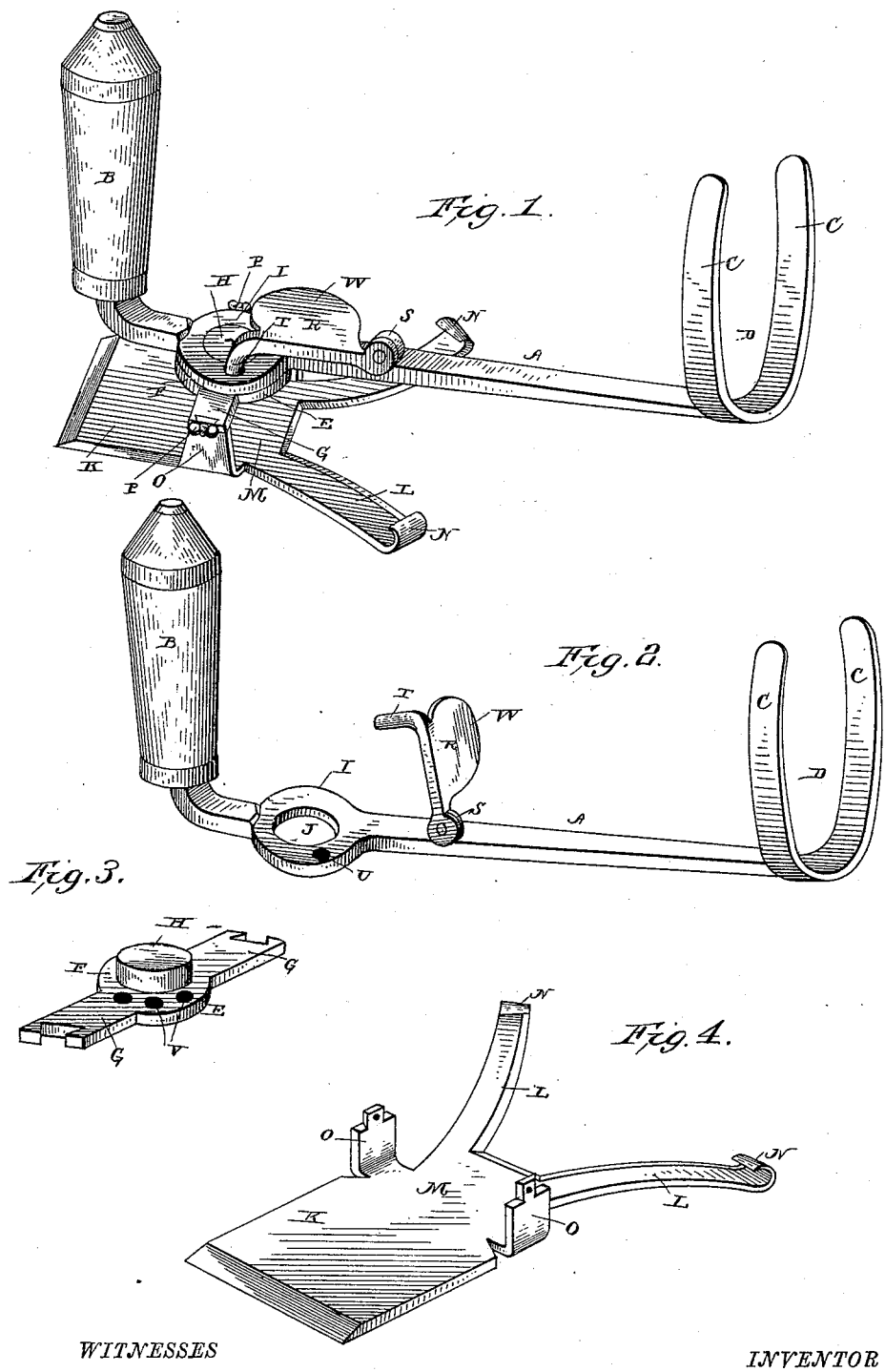

WILLIAM CONWELL, OF NEFF, INDIANA, ASSIGNOR OF ONE-HALF TO HARISON E. CLEVENGER, OF SAME PLACE.

HOOF PARER AND TRIMMER.

SPECIFICATION forming part of Letters Patent No. 405,080, dated June 11, 1889.

Application filed August 4, 1888. Serial No. 282,022. (No model.)

*To all whom it may concern:*

Be it known that I, WILLIAM CONWELL, of Neff, in the county of Randolph and State of Indiana, have invented certain new and useful Improvements in Hoof Parers and Trimmers; and I do hereby declare the following to be a full, clear, and exact description of the invention, such as will enable others skilled in the art to which it pertains to make and use the same.

My invention relates to a device adapted for use in paring and trimming the hoofs of horses, the object of my invention being to combine in a device of this character paring and trimming knives that are adjustable relative to the handle, and to make a device that will be simple in its construction, effective in operation, and yet be inexpensive.

The invention consists in the details of construction and combinations of parts hereinafter fully described, and pointed out in the claims.

In the accompanying drawings, Figure 1 represents a perspective view of my invention, and Figs. 2, 3, and 4 illustrate parts in detail.

Referring to the drawings, A represents a handle-bar turned upwardly at its forward end and provided with a handle B. The rear end of said handle-bar is extended on either side, forming portions C C, which are curved upwardly, approximating a semicircle, and thus form an arm-rest D.

E represents a base-plate consisting of the circular body portion F and the projecting side pieces G G. The said base-plate E is also provided with a pivot-post H, arranged at about the center of the circular body portion F.

The handle-bar A is formed near its forward end with an enlarged portion I. A bearing J is formed in said enlarged portion, and in said bearing J the pivot-post H is loosely secured, so that the base-plate may be revolved relative to the handle-bar.

The paring and trimming devices illustrated in Figs. 1 and 4 consist of a chisel-like paring-knife K and trimming-knives L L, formed integrally with the main-piece M. The paring-knife K is arranged at the forward end of the main piece and the trimming-knives L L at the rear end and extending rearwardly and outwardly, as shown. The said trimming-knives are curved upwardly upon themselves at their rear ends, as shown at N N, to provide the form of knife which is used in trimming around the frog of a horse's hoof.

The main piece M is provided laterally with upwardly-extending arms O O, which are dovetailed on their upper ends and arranged to slide into the dovetailed portions of the side pieces G G and be secured therein by a set-screw P, which passes through the arms O O and enters the side pieces G G.

From the foregoing description it will be seen that I provide a device for paring and trimming horses' hoofs, the knives of which are removably and adjustably secured to the handle. The mechanism for securing the knives in position when adjusted consists of a detent R, which is pivoted at its rear end to a lug S formed on the handle-bar A, there being a pin T arranged at the forward end of the detent and adapted to pass through a perforation U in the enlarged portion I, and also through one of a series of perforations V in the base-plate E.

W represents a finger-piece by which the detent R is operated.

The operation of my invention is as follows: To adjust the knives the detent R is raised and the base-plate revolved until the desired adjustment is attained. The perforations V are arranged closely together, so that almost any adjustment can be made by bringing one of the series of perforations V under the perforation U in the handle-bar. The detent is then lowered and the pin passes through the perforation U and one of the perforations V, and thereby secures the base-plate and at the same time the knives in place. The operator then grasps the handle B with the hand and allows the arm to rest in the arm-rest D. The knives can then be operated in any direction with ease and effectiveness.

As many slight changes in the details of form and construction might be devised without departing from the spirit of my invention, I do not limit myself to all of the detail features herein described; but I reserve to myself the right to make all such modifications as may properly fall within the scope of the following claims.

Having thus fully described my invention, what I claim as new, and desire to secure by Letters Patent, is—

1. The combination, with a handle-bar and main piece secured to said handle-bar, of a paring-knife and trimming-knives formed integrally with said main piece, substantially as described.

2. The combination, with a handle-bar provided with a handle and an arm-rest and a main piece secured to said handle-bar, of paring and trimming knives formed integrally with said main piece, substantially as described.

3. The combination, with a handle-bar and main piece secured thereto, of a straight knife formed on the forward end of said main piece and two rearwardly and outwardly extending knives formed on the rear end of said main piece, substantially as described.

4. The combination, with a handle-bar and a handle, of an enlarged portion provided with a bearing formed in said handle-bar, a base-plate provided with a pivot-post adapted to enter and be secured within said bearing, and knives secured to said base-plate, substantially as described.

5. The combination, with a handle and handle-bar provided with a perforation, of a detent, a base-plate provided with a series of perforations secured to said handle-bar, said detent adapted to enter the perforations in the handle-bar and base-plate, and knives secured to said base-plate, substantially as described.

6. The combination, with a handle-bar having an enlarged portion provided with a perforation and a bearing and a handle, of a detent secured to said handle-bar and adapted to enter the said perforation and one of a series of perforations formed in a base-plate, said base-plate provided with a pivot-post which is secured within said bearing, and knives secured to said base-plate, substantially as described.

In testimony whereof I have signed this specification in the presence of two subscribing witnesses.

WILLIAM CONWELL.

Witnesses:
H. E. CLEVENGER,
A. L. WRIGHT.